(12) United States Patent
Tokunaga (10) Patent No.: US 11,454,993 B2
(45) Date of Patent: Sep. 27, 2022

(54) FLOW RATE CONTROL APPARATUS, FLOW RATE CONTROL METHOD, AND PROGRAM RECORDING MEDIUM RECORDING FLOW RATE CONTROL PROGRAM

(71) Applicant: HORIBA STEC, Co., Ltd., Kyoto (JP)

(72) Inventor: Kazuya Tokunaga, Kyoto (JP)

(73) Assignee: HORIBA STEC, Co., Ltd., Kyoto (JP)

( * ) Notice: Subject to any disclaimer, the term of this patent is extended or adjusted under 35 U.S.C. 154(b) by 0 days.

(21) Appl. No.: 17/444,316

(22) Filed: Aug. 3, 2021

(65) Prior Publication Data
US 2022/0043466 A1 Feb. 10, 2022

(30) Foreign Application Priority Data
Aug. 5, 2020 (JP) .............................. JP2020-133398

(51) Int. Cl.
*G05D 7/06* (2006.01)
*G01F 1/36* (2006.01)

(52) U.S. Cl.
CPC ......... *G05D 7/0623* (2013.01); *G05D 7/0647* (2013.01); *G01F 1/363* (2013.01); *G05D 7/0635* (2013.01); *Y10T 137/7761* (2015.04)

(58) Field of Classification Search
CPC .... G01F 1/363; G05D 7/0623; G05D 7/0635; G05D 7/0647; F16K 37/005; Y10T 137/87917; Y10T 137/7761
USPC .............................................. 137/487.5, 613
See application file for complete search history.

(56) References Cited

U.S. PATENT DOCUMENTS

| 7,552,015 B2* | 6/2009 | Shajii ...................... G01F 25/10 137/12 |
| 9,690,301 B2* | 6/2017 | Mudd .................. G05D 7/0635 |
| 9,733,649 B2* | 8/2017 | Nagase ................. G01F 15/005 |
| 10,679,880 B2* | 6/2020 | Penley .................. B05B 12/087 |
| 11,003,198 B2* | 5/2021 | Mudd .................. G05D 7/0641 |
| 2009/0101217 A1* | 4/2009 | Ushigusa .................. G01F 1/36 137/511 |
| 2011/0108126 A1* | 5/2011 | Monkowski .............. F16K 7/14 137/12 |
| 2014/0182692 A1* | 7/2014 | Hirata ................... G01F 1/6965 137/486 |

(Continued)

FOREIGN PATENT DOCUMENTS

JP 2015109022 A 6/2015

*Primary Examiner* — William M McCalister
(74) *Attorney, Agent, or Firm* — Alleman Hall Creasman & Tuttle LLP (57) ABSTRACT

A flow rate control apparatus calculates a resistance flow rate, which is a flow rate of a fluid flowing through the fluid resistor, based on a first pressure measured by a first pressure sensor and a second pressure measured by a second pressure sensor, converts the resistance flow rate to a first valve flow rate, which is the flow rate of the fluid passing through a first valve, based on the first pressure, converts the resistance flow rate to a second valve flow rate, which is the flow rate of the fluid passing through a second valve, based on the second pressure, controls the first valve so that the deviation between a first set flow rate and the first valve flow rate becomes small, and controls the second valve so that the deviation between a second set flow rate and the second valve flow rate becomes small.

20 Claims, 7 Drawing Sheets

(56) References Cited

U.S. PATENT DOCUMENTS

| | | | | |
|---|---|---|---|---|
| 2015/0233746 A1* | 8/2015 | Igarashi | ................... | G01F 1/42 |
| | | | | 73/861.61 |
| 2016/0041564 A1* | 2/2016 | Mudd | ................. | G05D 7/0641 |
| | | | | 700/275 |
| 2016/0077531 A1* | 3/2016 | Kucera | .............. | F16K 37/0083 |
| | | | | 137/485 |
| 2018/0253111 A1* | 9/2018 | Goto | .................... | G01F 15/005 |
| 2019/0137309 A1* | 5/2019 | Sawada | .................. | G01F 25/10 |
| 2020/0201364 A1* | 6/2020 | Staudt | ...................... | F16K 1/42 |
| 2020/0225686 A1* | 7/2020 | Tanno | ................. | G05D 7/0647 |
| 2021/0240208 A1* | 8/2021 | Hirata | ................. | G05D 7/0617 |
| 2022/0043466 A1* | 2/2022 | Tokunaga | ............ | G05D 7/0647 |

* cited by examiner

FLOW RATE CONTROL APPARATUS, FLOW RATE CONTROL METHOD, AND PROGRAM RECORDING MEDIUM RECORDING FLOW RATE CONTROL PROGRAM

FIELD OF THE ART

The present claimed invention relates to a flow rate control apparatus for controlling, for example, a flow rate of a fluid.

BACKGROUND ART

In a semiconductor manufacturing process, various gases are supplied to a chamber in a controlled state with a desired flow rate. In recent years, high-speed control of the flow rate and further improvement of a flow rate accuracy have been required in this field (refer to the patent document 1), and a flow rate control apparatus using two control valves has been proposed to satisfy such requirements.

Concretely, this flow rate control apparatus has an arrangement wherein a first valve, a pressure type flow rate sensor, and a second valve are arranged in this order from an upstream side in a flow channel. For example, the first valve is controlled by feeding back a first pressure of the first pressure sensor arranged in an upstream side of a laminar flow element that constitutes the flow rate sensor so that the first pressure becomes constant at a desired set pressure. In addition, the second valve is controlled by feeding back a measure flow rate measured by the flow rate sensor so that the measured flow rate coincides with the set flow rate.

By the way, since a relationship between the flow rate and the pressure is non-linear, the lower the pressure, the more sensitive the pressure type flow rate sensor. As a result of this, it is better to set the set pressure at a value as small as possible and keep the first pressure, which is the pressure in the upstream side of the laminar flow element, at a low pressure to improve the accuracy of the flow rate control by the second valve.

However, if the set pressure is set too low, it is difficult for the first pressure to sufficiently exceed the sum of pressure drop at the laminar flow element and at the second valve and the pressure in a downstream side of the second valve, namely, difficult to obtain the necessary value so that the fluid cannot flow at a large flow rate in the downstream side of the second valve. On the other hand, if the set pressure is also increased to correspond to a size of the set flow rate, an increase in the pressure will occur before and after the laminar flow element. As a result, there is some possibility that flow rate control is performed in a state wherein the flow rate sensor characteristics differ greatly for each set flow rate, and it becomes difficult to keep a control accuracy constant for changes in the set flow rate.

PRIOR ART DOCUMENT

Patent Document

[Patent document 1]
Japanese Unexamined Patent Application Publication No. 2015-109022

SUMMARY OF THE INVENTION

Problems to be Solved by the Invention

The present claimed invention was made in consideration of the above-mentioned problems, and a main object of this invention is to provide a flow rate control apparatus that can eventually keep a pressure in an inside of the apparatus low and keep the sensitivity of the flow rate sensor high even though a size of the set flow rate changes so that the flow rate control accuracy is improved.

More specifically, the flow rate control apparatus in accordance with this invention is characterized by comprising a first valve arranged in a flow channel, a second valve arranged in a downstream side of the first valve in the flow channel, a fluid resistor arranged between the first valve and the second valve in the flow channel, a first pressure sensor that measures a pressure in a first volume between the first valve and the fluid resistor, a second pressure sensor that measures a pressure in a second volume between the fluid resistor and the second valve, a resistance flow rate calculator that calculates a resistance flow rate, which is a flow rate of a fluid flowing through the fluid resistor, based on a first pressure measured by the first pressure sensor and a second pressure measured by the second pressure sensor, a first valve flow rate converter that converts the resistance flow rate to a first valve flow rate, which is the flow rate of the fluid passing through the first valve, based on a first pressure, a second valve flow rate converter that converts the resistance flow rate to a second valve flow rate, which is the flow rate of the fluid passing through the second valve, based on a second pressure, a first valve controller that controls the first valve so that the deviation between a first set flow rate and the first valve flow rate becomes small, and a second valve controller that controls the second valve so that the deviation between a second set flow rate and the second valve flow rate becomes small.

In addition, a flow rate control method in accordance with this invention is a flow rate control method using a flow rate control apparatus comprising a first valve arranged in a flow channel, a second valve arranged in a downstream side of the first valve in the flow channel, a fluid resistor arranged between the first valve and the second valve in the flow channel, a first pressure sensor that measures a pressure in a first volume between the first valve and the fluid resistor, and a second pressure sensor that measures a pressure in a second volume between the fluid resistor and the second valve, and the flow rate control method comprises calculating a resistance flow rate, which is a flow rate of a fluid flowing through the fluid resistor, based on a first pressure measured by the first pressure sensor and a second pressure measured by the second pressure sensor, converting the resistance flow rate to a first valve flow rate, which is the flow rate of the fluid passing through the first valve, based on the first pressure, converting the resistance flow rate to a second valve flow rate, which is the flow rate of the fluid passing through the second valve, based on the second pressure, controlling the first valve so that the deviation between a first set flow rate and the first valve flow rate becomes small, and controlling the second valve so that the deviation between a second set flow rate and the second valve flow rate becomes small.

In accordance with this arrangement, it is possible to obtain the first valve flow rate actually flowing in the first valve upstream of the resistance flow rate and the second valve flow rate actually flowing in the second valve downstream of the resistance flow rate respectively. For example, when the flow rate of the fluid flowing through the flow channel is neither constant nor stable and the flow rate rises or falls, the flow rates passing through the first and second valves are not the same. However, in accordance with the present invention, it is possible to enable the opening degrees required to achieve each set flow rate in the first and second valves separately based on the first valve flow rate and the second valve flow rate.

More concretely, in case that the flow rate is to be increased from the current level, the first valve controller controls the first valve so that the first pressure is increased, and the second valve controller controls the second valve so that the second pressure is decreased. In case that the flow rate is to be reduced from the current level, the reverse operation described above is achieved. As a result of this, since the first and second pressures can be varied in opposite directions by the two valves respectively, it is possible to increase or decrease the flow rate at a high speed to be adjusted and the average pressure of the first and second pressures can be kept at an almost constant pressure. In addition, it is possible to keep the sensitivity also as a pressure type flow rate sensor high by adjusting this average pressure to a pressure suitable for the calculation of the resistance flow rate.

To make it possible to obtain the first valve flow rate flowing in the upstream side of the fluid resistor with an accuracy or speed used for fluid control based on the resistance flow rate, the first valve flow rate converter may calculate the first valve flow rate based on the resistance flow rate and a time differential value of the first pressure.

To make it possible to obtain the second valve flow rate flowing in the downstream side of the fluid resistor with an accuracy or speed used for fluid control based on the resistance flow rate, the second valve flow rate converter may calculate the second valve flow rate based on the resistance flow rate and a time differential value of the second pressure.

In case that the resistance flow rate is $Q_{FR}$, the first valve flow rate is $Q_{V1}$, the second valve flow rate is $Q_{V2}$, the first pressure is $p_1$, the second pressure is $p_2$, the first conversion coefficient is $A_1$, and the second conversion coefficient is $A_2$ based on an amount of the fluid flowing in and out from the first volume wherein the first pressure is measure by the first pressure sensor and the second volume wherein the second pressure is measured by the second pressure sensor, it is represented that the first valve flow rate converter calculates the first valve flow rate by $Q_{V1}=Q_{FR}-A_1*d(p_1)/dt$, and the second valve flow rate converter calculates the second valve flow rate by $$Q_{V2}=Q_{FR}-A_2* d(p_2)/dt.$$

To make it possible to obtain the first valve flow rate and the second valve flow rate more accurately with considering a difference between an ideal gas and a real gas, in case that a size of the first volume is $VL_1$, a size of the second volume is $VL_2$, a gas constant is R, temperature is T, and a compressibility factor is Z, it may be $$A_1=Z * VL_1/RT \text{ and } A_2=Z * VL_2/RT.$$

To make it possible to make the first pressure and the second pressure change symmetrically and to keep an absolute value of the first pressure or the second pressure at a small value so that a measurement sensitivity of the flow rate is kept high, the first set flow rate and the second set flow rate may be set as the same time function. In other words, the same targe flow rate value may be set for each time as the first set flow rate and the second set flow rate. In addition, a set flow rate having no phase difference is set for the first set flow rate and the second set flow rate respectively.

To make it possible to charge the fluid having a sufficient supply pressure at a time when the fluid subsequently flows out in a state wherein no fluid flows out from the flow rate control apparatus into inside of the flow rate control apparatus, the first valve controller may control an opening degree of the first valve so that the deviation between the first pressure and the set pressure becomes small in a state wherein the second valve is fully closed by the second valve controller.

To make it possible to control each valve so that the flow rate changes to a final target value at high speed at a time of rising or falling of the flow rate, the first valve controller may control the opening degree of the first valve so that the deviation between the first set flow rate and the first valve flow rate becomes small, and the second valve controller may control the opening degree of the second valve so that the deviation between the second set flow rate and the second valve flow rate becomes small during a predetermined period after the time when the second set flow rate reaches a value other than zero in a state wherein the second valve is fully closed.

To improve the sensitivity as a flow rate sensor by keeping a state wherein the flow rate flowing in the flow channel approaches to a final targe value and decreasing the first pressure or the second pressure, the first valve controller may control the opening degree of the first valve so that the deviation between the first set flow rate $Q_{r1}$-x after correction and the first valve flow rate $Q_{v1}$ becomes small, in a state wherein an absolute value of the deviation in the first valve controller or the second valve controller becomes less than or equal to a predetermined value, in case that the first set flow rate is $Q_{r1}$ and the correction value is x.

To make it possible to flow the fluid easily by decreasing the resistance against the fluid of the flow rate control apparatus itself in case of continuing the flow rate at a constant after completion of the flow rate rising or dropping, the second valve controller may control the opening degree of the second valve to a fully open state, and the first valve controller may control the opening degree of the first valve so that the deviation between the first set flow rate and $Q_{FR}+A_1* d(p_1)/dt$, which is the first valve flow rate, becomes small, after the second valve flow rate flowing out from the second valve is stabilized at the set flow rate.

To make it possible to correct a parameter used by the first valve flow rate converter or the second valve flow rate converter and to calculate the first flow rate or the second flow rate accurately even though there is some instrumental error or some change over years of the flow rate control apparatus, the flow rate control apparatus may further comprise the first volume, which is a space formed between the first valve and the fluid resistor and wherein the first pressure is measured by the first pressure sensor, the second volume, which is a space formed between the fluid resistor and the second valve and wherein the second pressure is measured by the second pressure sensor, and a diagnizer that identifies a size of the first volume or the second volume based on the resistance flow rate, the first pressure or the second pressure, and the diagnizer may correct the parameter used for flow rate conversion in the first valve flow rate converter or the second valve flow rate converter based on the size of the first volume or the second volume.

To make it possible to enable the flow rate control with higher speed by making the flow rate control by the first valve tailored to the pressure of the first set flow rate or the pressure of the fluid, the flow rate control apparatus may further comprise a supply pressure sensor arranged in an upstream side of the first valve, and the first valve controller may comprise a first operation amount output part that outputs to the first valve an operation amount calculated based on a deviation between the first set flow rate and the first valve flow rate and a control coefficient that has been previously set, and the first control coefficient adjustment part that adjusts the control coefficient set in the first operation amount output part based on a differential pressure $\Delta p_1$ between the supply pressure $p_0$ measured by the supply pressure sensor and the first pressure $p_1$ measured by the first pressure sensor, and the first set flow rate $Q_{v1}$.

To make it possible to enable the flow rate control with a higher speed by making the flow rate control by the second valve tailored to the pressure of the second set flow rate or the pressure of the fluid, the second valve controller may comprise a second operation amount output part that outputs an operation amount calculated based on a deviation between the second set flow rate and the second valve flow rate and the control coefficient that has been previously set to the second valve, and the second control coefficient adjustment part that adjusts the control coefficient set in the second operation amount output part based on the differential pressure $\Delta p_2$ between the second pressure $p_2$ measured by the second pressure sensor and a downstream side pressure pa which is a pressure in a downstream side of the second valve, and the second set flow rate $Q_{v2}$.

To make it possible to set a control coefficient that reflects a state of an orifice formed between a valve body and valve seat of the first valve, the first control coefficient adjustment part may adjust the control coefficient based on a function $B_1*(\Delta p_1)^{c1}$ of the differential pressure $\Delta p_1$, in case that $B_1$ is a positive number and C1 is a positive number greater than 0 and less than 1.

To make it possible to set a control coefficient that reflects a state of an orifice formed between a valve body and valve seat of the second valve, the second control coefficient adjustment part may adjust the control coefficient based on a function $B_2*(\Delta p_2)^{C2}$ of the differential pressure $\Delta p_2$, in case that $B_2$ is a positive number and C2 is a positive number greater than 0 and less than 1.

To improve a speed of the flow rate control especially in case that a sound speed condition is satisfied in the first vale and the second valve, C1 or C2 may be ½.

To make it possible to improve a rising characteristic of the flow rate in case that a large amount of the flow rate flows, it may be so that the bigger the value of the first set flow rate or the second set flow rate, the bigger the value of the control coefficient is set.

As a concrete embodiment that is suitable for controlling the flow rate at a high speed represented is that the control coefficient is a PID coefficient, and the first control coefficient adjustment part and the second control coefficient adjustment part adjust at least a proportional gain.

To make it possible for a flow rate control apparatus comprising conventional two valves to obtain the same effect as that of the flow rate control apparatus in accordance with this invention by updating a program, it is preferable to use a flow rate control program used for a flow rate control apparatus comprising a first valve arranged in a flow channel, a second valve arranged in a downstream side of the first valve in the flow channel, a fluid resistor arranged between the first valve and the second valve in the flow channel, a first pressure sensor that measures a pressure in a first volume between the first valve and the fluid resistor, and a second pressure sensor that measures a pressure in a second volume between the fluid resistor and the second valve may be used and the program is characterized by making a computer exhibit functions as a resistance flow rate calculator that calculates a resistance flow rate, which is a flow rate of a fluid flowing through the fluid resistor, based on a first pressure measured by the first pressure sensor and a second pressure measured by the second pressure sensor, a first valve flow rate converter that converts the resistance flow rate to a first valve flow rate, which is the flow rate of the fluid passing through the first valve, based on the first pressure, a second valve flow rate converter that converts the resistance flow rate to a second valve flow rate, which is the flow rate of the fluid passing through the second valve, based on the second pressure, a first valve controller that controls the first valve so that the deviation between a first set flow rate and the first valve flow rate becomes small, and a second valve controller that controls the second valve so that the deviation between a second set flow rate and the second valve flow rate becomes small.

The program may be electronically delivered or may be recorded on a program recording medium such as a CD, DVD, flash memory, or the like.

EFFECT OF THE INVENTION

In accordance with the flow rate control apparatus of the present claimed invention, it is possible to calculate the flow rate of the fluid actually flowing in the first valve and the flow rate of the fluid actually flowing in the second valve based on the resistance flow rate and the first pressure or the second pressure, and to control the flow rate by the first valve or the second valve individually based on the respective calculated flow rates flowing in the first valve and in the second valve and the set flow rate. As a result of this, the internal pressure in the flow rate control apparatus can be kept low by reversing the direction of change of the first pressure and the second pressure respectively, while changing the flow rate at high speed to the target flow rate value, and the sensitivity of the resistance flow rate can be kept high. Therefore, since the resistance flow rate, which is the basis of each flow rate to be measured, can be made highly sensitive, it is also possible to increase the accuracy of flow rate control realized as the flow rate control apparatus.

BEST MODES FOR EMBODYING THE INVENTION

A flow rate control apparatus 100 in a first embodiment of the present claimed invention will be described with reference to FIG. 1 to FIG. 4.

The flow rate control apparatus 100 of the first embodiment is used to supply a gas in a chamber at a predetermined set flow rate, for example, in a semiconductor manufacturing process. More specifically, a flow channel wherein the flow rate control apparatus 100 is arranged is connected to a vacuum drawing chamber.

Figure 1:
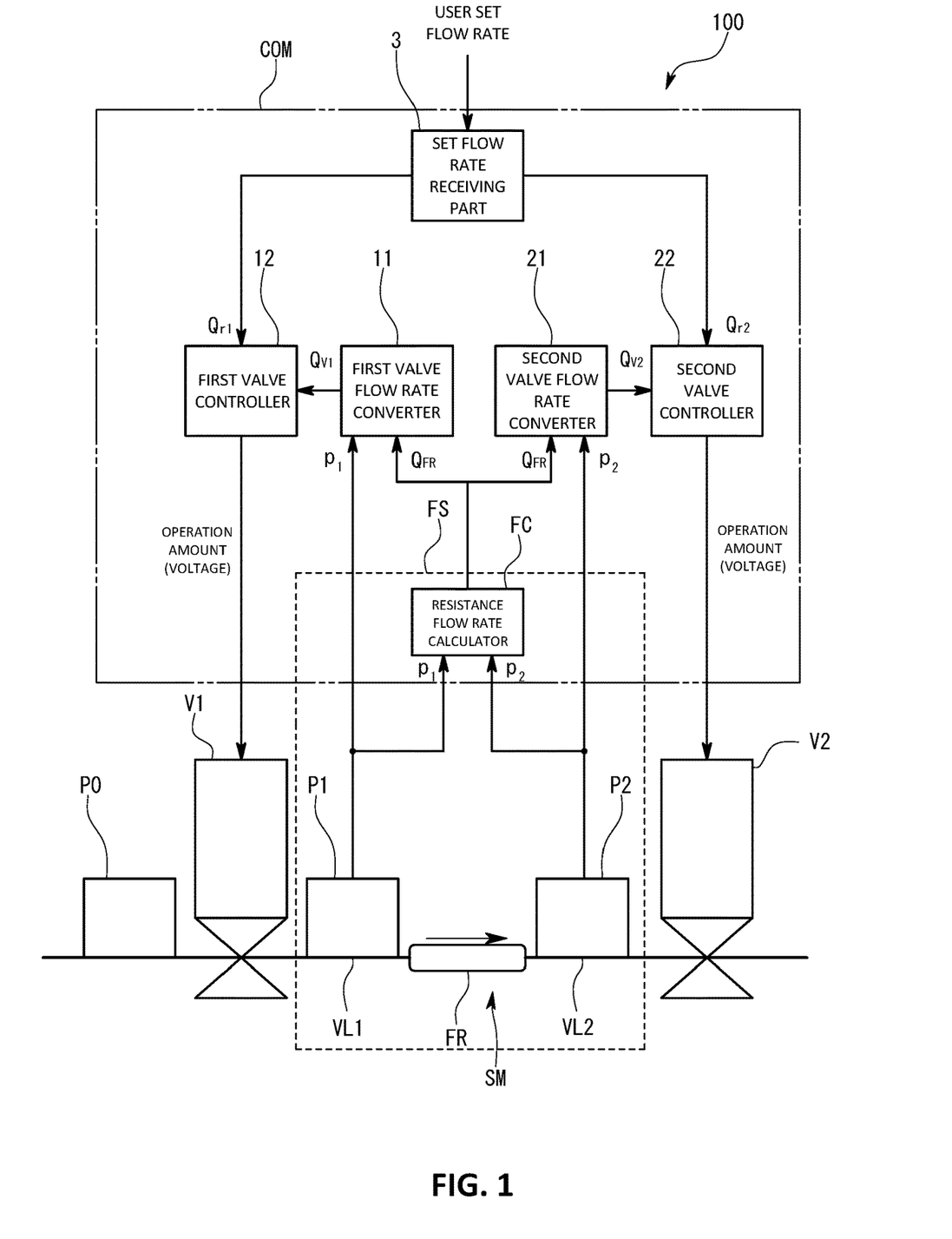
FIG. 1 is schematic diagram showing a configuration of a flow rate control apparatus in a first embodiment of the present claimed invention.

As shown in FIG. 1, the flow rate control apparatus 100 comprises fluid equipment composed of sensors and valves arranged in the flow channel, and a control operation mechanism (COM) that controls the fluid equipment.

The fluid equipment comprises a supply pressure sensor P0, a first valve V1, a first pressure sensor P1, a fluid resistor (FR), a second pressure sensor P2, and a second valve V2 arranged in the flow channel. Each component is arranged in this order from an upstream side in the flow channel.

In this embodiment, the fluid resistor (FR) is a laminar flow element, and a flow rate of the gas flowing in the fluid resistor (FR) is generated in accordance with a differential pressure before and after the fluid resistor (FR). The first pressure sensor P1, the fluid resistor (FR), the second pressure sensor P2, and a resistance flow rate calculator (FC), which is to be described below, constitute a flow rate sensor (FS) that measures the flow rate of the fluid flowing in the flow channel between the first valve V1 and the second valve V2. More specifically, the first pressure sensor P1, the fluid resistor (FR), and the second pressure sensor P2 are a sensing mechanism (SM) that outputs an output signal corresponding to the flow rate of the fluid flowing in the flow channel, and the resistance flow rate calculator (FC) calculates the flow rate of the fluid flowing in the flow channel based on the output signal of the sensing mechanism (SM). Since this flow rate sensor (FS) is a so-called pressure type flow rate sensor, it has a characteristic that the lower the pressure measured by each pressure sensor, the higher the measurement accuracy of the measured flow rate.

The supply pressure sensor P0 is used for monitoring the pressure of the gas supplied from the upstream side. The supply pressure sensor P0 may be omitted in case that it is guaranteed that the supply pressure is stable.

The first pressure sensor P1 measures the pressure (hereinafter also referred to the first pressure) of the gas charged in the first volume VL1, which is the volume between the first valve V1 and the fluid resistor (FR) in the flow channel.

The second pressure sensor P2 measures the pressure (hereinafter also referred to the second pressure) of the gas charged in the second volume $V_{L2}$, which is the volume between the fluid resistor (FR) and the second valve V2 in the flow channel.

As mentioned above, the first pressure sensor P1 and the second pressure sensor P2 measure the pressure of the first volume VL1 and the second volume $V_{L2}$ respectively, which are the two volumes formed by the first valve V1, the fluid resistor FR, and the second valve V2. In addition, in other words, the first pressure sensor P1 and the second pressure sensor P2 measure the pressure in the respective volumes located before and after the fluid resistor (FR).

The first valve V1 and the second valve V2 are of the same type in this embodiment, and are, for example, piezoelectric valves in which the valve body is driven relative to the valve seat by a piezo element. The first valve V1 and the second valve V2 are not limited to the piezoelectric valves but may use other driving principle such as solenoid valves or the like. The first valve V1 and the second valve V2 may be symmetrically arranged on the upstream side and the downstream side respectively with the fluid resistor (FR) at the center so that the first volume VL1 and the second volume $V_{L2}$ are configured to be almost the same size. In addition, in this embodiment, both the first valve V1 and the second valve V2 have their opening degrees respectively controlled by the flow rate feedback control. More concretely, the flow rate of the fluid actually flowing through the first valve V1 and the second valve V2 respectively in a certain control cycle is calculated, and the first valve V1 and the second valve V2 are feedback controlled respectively based on those respective flow rates. More specifically, as shown in FIG. 1, a first flow rate feedback loop controlling the first valve V1 and a second flow rate feedback loop controlling the second valve V2 are formed independently of each other.

Next, the control operation mechanism (COM) will be described in detail. The control operation mechanism (COM) is a so-called computer comprising, for example, a CPU, a memory, an A/D converter, a D/A converter, and an input/output means, etc. The control operation mechanism (COM) produces at least functions as a set flow rate receiving part 3, a resistance flow rate calculator (FC), a first valve flow rate converter 11, a second valve flow rate converter 21, a first valve controller 12, and a second valve controller 22 by cooperatively operating each device by executing flow rate control programs stored in the memory.

The set flow rate receiving part 3 receives the set flow rate to be realized by the flow rate control apparatus 100 from a user, for example, in a form of a time function. The set flow rate receiving part 3 inputs a first set flow rate $Q_{r1}$ and a second set flow rate $Q_{r2}$ to the first valve controller 12 and the second valve controller 22 respectively based on the set flow rate set by the user. In this embodiment, the first set flow rate $Q_{r1}$ and the second set flow rate $Q_{r2}$ are set to be the same as the set flow rate set by the user. More specifically, the same time function set by the user is set for the first set flow rate $Q_{r1}$ and the second set flow rate $Q_{r2}$, and the same target flow rate is used for the control operation at each time. For example, the first set flow rate $Q_{r1}$ and the second set flow rate $Q_{r2}$ may be different from each other. Concretely, although there is no phase difference in the first set flow rate $Q_{r1}$ and the second set flow rate $Q_{r2}$ in the above-mentioned example, the first set flow rate $Q_{r1}$ and the second set flow rate $Q_{r2}$ may be set with a predetermined phase advance or phase delay individually given to the set flow rate set by the user.

The resistance flow rate calculator (FC) calculates the flow rate based on a measured value indicated by the output signal of the sensing mechanism (SM) and a flow rate characteristic value according to the measured value. Concretely, the resistance flow rate calculator (FC) calculates the flow rate of the fluid flowing in the fluid resistor (FR) based on the first pressure $p_1$, which is the pressure in the upstream side of the fluid resistor (FR), and the second pressure $p_2$, which is the pressure in the downstream side of the fluid resistor (FR), each of which is the measured value indicated by the output signal of the sensing mechanism (SM). In this embodiment, the resistance flow rate calculator (FC) calculates the flow rate based on not only the first pressure $p_1$ and the second pressure $p_2$ but also the flow rate characteristic value determined according to the characteristics of the fluid resistor (FR).

More specifically, the resistance flow rate calculator (FC) calculates the flow rate based on the equation $Q_{FR}=(p_1-p_2)/RV$, for example, in case that the resistance flow rate is $Q_{FR}$, the flow channel resistance due to the fluid resistor (FR) is (RV), the first pressure is $p_1$ and the second pressure is $p_2$. In this embodiment, the flow channel resistance (RV) changes under an influence of the first pressure $p_1$ and the second pressure $p_2$. More specifically, the flow channel resistance (RV), which is the flow rate characteristic value, can be determined based on the first pressure $p_1$ and the differential pressure $\Delta P$ between the first pressure $p_1$ and the second pressure $p_2$. The resistance flow rate calculator (FC) may be configured to calculate the flow channel resistance (RV) from a multivariable function with the first pressure $p_1$ and the differential pressure $\Delta P$ as parameters. In addition, the resistance flow rate calculator (FC) may also be configured to determine the flow channel resistance (RV) by referring to a table of the flow channel resistance (RV) which has been determined in advance by experiments or the like, the first pressure $p_1$, and the differential pressure $\Delta P$.

Figure 2A:
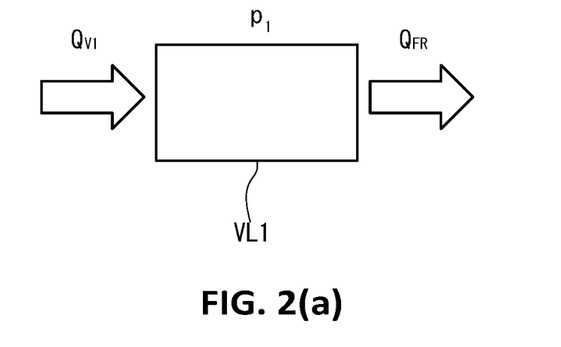
FIGS. 2(a) and 2(b) are schematic diagrams showing a relationship between an outflow/inflow of a gas from/to a first volume or a second volume and a pressure change in the first embodiment.

The first valve flow rate converter 11 converts the resistance flow rate $Q_{FR}$ into the first valve flow rate $Q_{v1}$, which is the flow rate of the fluid passing through the first valve V1, based on the first pressure $p_1$. In this embodiment, since the first valve V1 is arranged in the upstream side of the fluid resistor (FR) away from the fluid resistor (FR) by a predetermined distance, there is a discrepancy between a measurement point of the resistance flow rate $Q_{FR}$ and a control point of the flow rate by the first valve V1. As a result of this, it can be said that the first valve flow rate $Q_{v1}$ is the flow rate of the gas flowing through the control point of the first valve V1. More concretely, the resistance flow rate $Q_{FR}$ output from the resistance flow rate calculator (FC) in a certain control cycle is a value close to a value of the first valve flow rate $Q_{v1}$ at a time of a predetermined time ago and the value does not indicate the current flow rate. As a result of this, as shown in FIG. 2(*a*), the first valve flow rate converter 11 calculates the first valve flow rate $Q_{v1}$ based on a change amount of the flow rate of the gas flowing into and out of the first volume VL1 and a change amount of the first pressure $p_1$ caused by the change amount in the flow rate of the gas.

More specifically, a relationship between the change amount of the flow rate in the first volume VL1 and the change amount of the pressure can be described as follows based on an ideal gas state equation.

$$(d(p_1)/dt)VL_1 = (Q_{v1} - Q_{FR})RT$$

Where, $d(p_1)/dt$ is a time differential value of the first pressure, which indicates the pressure change in the first volume VL1 in a very short time, (R) is a gas constant, (T) is a temperature of the gas, and $VL_1$ is a volume value of the first volume VL1. As the temperature of the gas used is a value measured by a temperature sensor, which is not shown in drawings, arranged in a block wherein the internal flow channel of the flow rate control apparatus 100 is formed.

From the above equation, the first valve flow rate $Q_{V1}$ can be described as follows.

$$Q_{V1} = Q_{FR} + A_1 d(p_1)/dt$$

Where, $A_1$ is a first conversion coefficient and in this embodiment $A_1$ is set to be a value of, for example, 1. The first valve flow rate converter 11 calculates the first valve flow rate $Q_{V1}$ based on the resistance flow rate $Q_{FR}$ and the time differential value of the first pressure $p_1$ according to the above equation. The first conversion coefficient $A_1$ does not presuppose an ideal gas but may be a value set in consideration of the discrepancy between the ideal gas and the actual gas. More specifically, in case that a compressibility coefficient is (Z), the first conversion coefficient may be defined as $A_1 = Z^* VL_1/RT$.

Figure 2B:
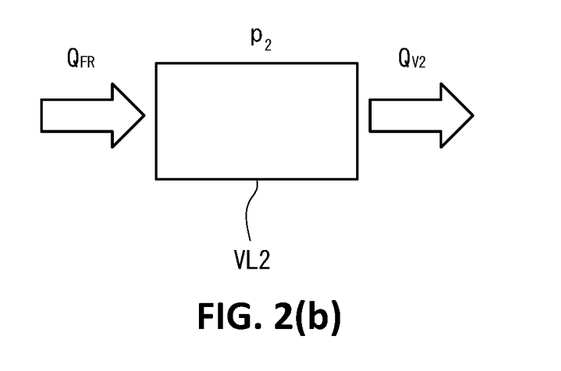

The second valve flow rate converter 21 converts the resistance flow rate $Q_{FR}$ into the second valve flow rate $Q_{V2}$, which is the flow rate of the fluid passing through the second valve V2, based on the second pressure $p_2$. In this embodiment, since the second valve V2 is arranged in the downstream side of the fluid resistor (FR) away from the fluid resistor (FR) by a predetermined distance, there is a discrepancy between a measurement point of the resistance flow rate $Q_{FR}$ and a control point of the flow rate by the second valve V2. As a result of this, it can be said that the second valve flow rate $Q_{V2}$ is the flow rate of the gas flowing through the control point of the second valve V2. More concretely, the resistance flow rate $Q_{FR}$ output from the resistance flow rate calculator (FC) in a certain control cycle is a value close to a value of the second valve flow rate $Q_{V2}$ after a predetermined time and the value does not indicate the current flow rate. As a result of this, as shown in FIG. 2(*b*), the second valve flow rate converter 21 calculates the second valve flow rate $Q_{V2}$ based on a change amount of the flow rate of the gas flowing into and out of the second volume $V_{L2}$ and a change amount of the second pressure $p_2$ caused by the change amount in the flow rate of the gas.

More specifically, a relationship between the change amount of the flow rate in the second volume $V_{L2}$ and the change amount of the pressure can be described as follows based on an ideal gas state equation.

$$(d(p_2)/dt)VL_2 = (Q_{FR} - Q_{V2})RT$$

Where, $d(p_2)/dt$ is a time differential value of the second pressure, which indicates the pressure change in the second volume $V_{L2}$ in a very short time, (R) is the gas constant, (T) is the temperature of the gas, and $V_{L2}$ is a volume value of the second volume $V_{L2}$.

Accordingly, the second valve flow rate $Q_{V2}$ can be described as follows.

$$Q_{V2} = Q_{FR} - A_2 d(p_2)/dt$$

Where, $A_2$ is a coefficient and in this embodiment $A_2$ is set to be a value of, for example, 1. The second valve flow rate converter 21 calculates the second valve flow rate $Q_{V2}$ based on the resistance flow rate $Q_{FR}$ and the time differential value of the second pressure $p_2$ according to the above equation. The second conversion coefficient $A_2$ does not presuppose the ideal gas but may be a value set in consideration of the discrepancy between the ideal gas and the actual gas. More specifically, in case that the compressibility coefficient is (Z), the second conversion coefficient may be defined as $$A_2 = Z^* VL_2/RT.$$

The first valve controller 12 shown in FIG. 1 controls the first valve V1 so that the deviation between the first set flow rate $Q_{r1}$ and the first valve flow rate $Q_{V1}$ becomes small. In this embodiment, the first valve controller 12 applies a voltage corresponding to the deviation to the first valve V1 as an operation amount. In this embodiment, the first valve controller 12 also performs not only flow rate feedback control based on the deviation between the first set flow rate $Q_{r1}$ and the first valve flow rate $Q_{V1}$ but also pressure feedback control based on the deviation between the first pressure $p_1$ and the set pressure that has been previously set depending on a control state. In addition, during a transition period when the flow rate transitions from a transient response state to a stable state, the first valve controller 12 may also perform the flow rate feedback control by further correcting the first valve flow rate $Q_{V1}$ output by the first valve flow rate converter 11. For each control, for example, PID control can be applied, but the first valve controller 12 may be configured to control the first valve V1 based on the other control law.

The second valve controller 22 shown in FIG. 1 controls the second valve V2 so that the deviation between the second set flow rate $Q_{r2}$ and the second valve flow rate $Q_{V2}$ becomes small. In this embodiment, the second valve controller 22 applies a voltage corresponding to the deviation to the second valve V2 as the operation amount. In this embodiment, for example, PID control may be applied to the flow feedback control based on the deviation between the second set flow rate $Q_{r2}$ and the second valve flow rate $Q_{V2}$ but the second valve controller 22 may be configured to control the second valve V2 based on the other control law.

Figure 3:
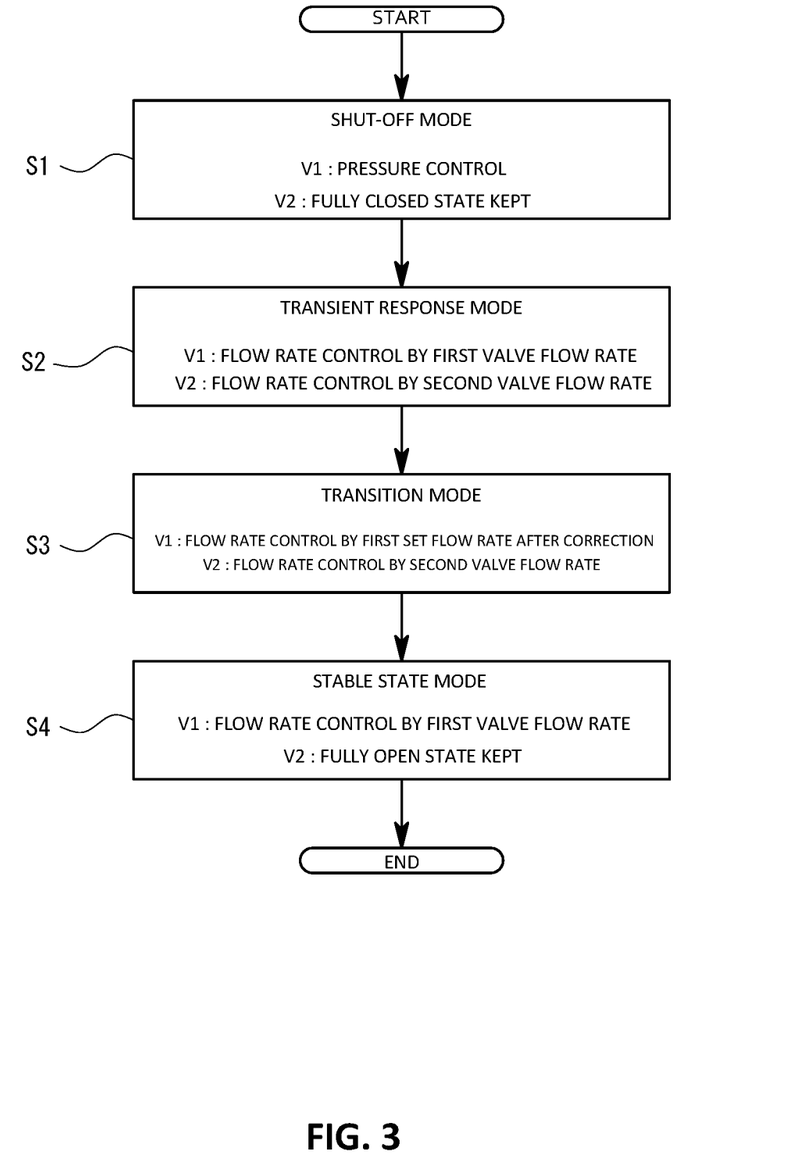
FIG. 3 is a flow chart showing change in the control mode of the flow rate control apparatus in the first embodiment.

Next, the operation of the first valve controller 12 and the second valve controller 22 will be described with reference to a flow chart in FIG. 3, in case that the set flow rate is given as a step function wherein the set flow rate changes in a stepwise manner from zero to a predetermined target value.

During a standby period when the set flow rate is kept zero, in a state wherein the second valve controller 22 fully closes the second valve V2, the first valve controller 12 performs the pressure feedback control on the opening degree of the first valve V1 so that the deviation between the first pressure $p_1$ and the set pressure that has been previously set becomes small (shut-off mode: Step S1). More specifically, the first valve controller 12 controls the first valve V1 so that a predetermined supply pressure is charged to the first volume VL1 and the second volume VL2 in preparation for rise in the flow rate. The set pressure is set to a pressure (low pressure) according to the sensitivity that a user wants to achieve, for example, in the flow rate sensor (FS).

Next, during a predetermined period after the time when the second set flow rate $Q_{r2}$ reaches a value other than zero in a state wherein the second valve V2 is fully closed, namely, during a transient response period while the set flow rate rises and the flow rate of the gas flowing in the flow channel changes significantly, the first valve controller 12 controls the opening degree of the first valve V1 so that the deviation between the first set flow rate $Q_{r1}$ and the first valve flow rate $Q_{V1}$ becomes small, and the second valve controller 22 controls the opening degree of the second valve V2 so that the deviation between the second set flow rate $Q_{r2}$ and the second valve flow rate $Q_{V2}$ becomes small (transient response mode: Step S2). In the transient response period, since flow rate control is performed simultaneously by the two valves V1 and V2, the pressure in the first volume VL1 is increased and the pressure in the second volume $V_{L2}$ is reduced so that a differential pressure required to achieve the target flow rate is formed in a short period of time. As a result of this, it is possible to improve the responsiveness at a time when the flow rate starts up. At a time when the flow rate falls, the opposite operation as described above can be used to achieve the target responsiveness.

After the flow rate of the gas flowing in the flow channel approaches a final target value of the set flow rate and a state in which an absolute value of the deviation calculated in the first valve controller 12 or the second valve controller 22 becomes less than or equal to a predetermined value continues for a predetermined period, the control mode of the first valve controller 12 changes. More specifically, in case that the first set flow rate is $Q_{r1}$ and the correction value is x, the first valve controller 12 controls the opening degree of the first valve V1 so that the deviation between the corrected first set flow rate $Q_{r1}$-x and the corrected first valve flow rate $Q_{V1}$ becomes small (transition mode: step S3). More specifically, the first valve controller 12 makes the opening degree of the first valve V1 smaller than the current state to realize the flow rate that is smaller than the first set flow rate $Q_{r1}$ by an amount of a correction value (x). This is to give an allowance by a predetermined amount to the opening degree of the first valve V1 compared to the full opening degree in the flow rate control during a stable period to be explained next. Even if the first valve V1 is controlled so that the flow rate is different from the set flow rate set by the user by a subtle amount, the second valve controller 22 continues the flow rate feedback control to realize the set flow rate of the second valve V2 locating in the downstream side of the first valve V1. As this result, there is no chance that the flow rate different from the target is supplied to the chamber.

After the second valve flow rate $Q_{V2}$ flowing out from the second valve V2 has stabilized at the set flow rate $Q_r$ set by the user, or during the stable period when $d(p_1)/dt$ and $d(p_2)/dt$ are almost zero, the second valve controller 22 controls the opening degree of the second valve V2 to a fully open state, and the first valve controller 12 controls the opening degree of the first valve V1 so that the deviation between the first set flow rate $Q_{r1}$ and $Q_{FR}$ +$d(p_1)/dt$, which is the first valve flow rate, becomes small (stable state mode: Step S4). More specifically, instead of controlling the flow rate by two valves in the stable period, the second valve V2 is deactivated in the fully open state, and the flow rate is controlled only by the first valve V1 arranged in the upstream side. Since the second valve V2 is fully open, it is possible to facilitate the gas flow and to improve the accuracy of flow rate control by reducing the flow channel resistance as the flow rate control apparatus 100. The change in the control mode of the steps S1 to S4 is not limited to this order but may also change from the state of each of the steps S2 to S4 to the state of the step S1. In addition, the state may change across each of the steps depending on the setting.

Figure 4:
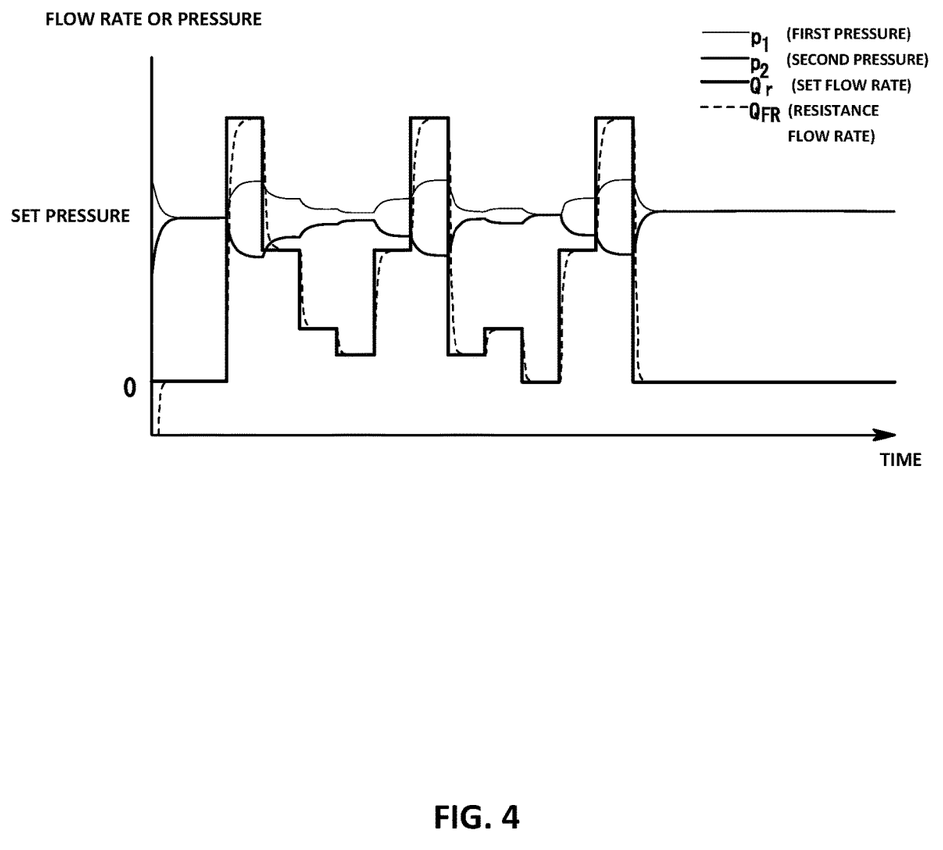
FIG. 4 is a graph showing a pressure change due to flow rate control of the flow rate control apparatus in the first embodiment.

The effect of the flow rate control apparatus 100 of this embodiment will be explained with reference to the graph in FIG. 4 regarding the change of the first pressure $p_1$ and the second pressure $p_2$ by the flow rate control as described above.

When the set flow rate is increased or decreased as shown by a thick solid line, the first pressure $p_1$ shown by a thin line and the second pressure $p_2$ shown by a solid line change symmetrically with the direction of change being opposite and the amount of change being almost the same, centering on the set pressure that was kept when the flow rate was zero. More concretely, it becomes clear both that the first pressure $p_1$ and the second pressure $p_2$ change so that the bigger the set flow rate, the bigger the differential pressure, and that the average pressure is kept at almost the same value as the initial set pressure. More specifically, it becomes clear that the flow rate control apparatus 100 of the present embodiment can prevent the sensitivity of the flow rate sensor (FS) from being degraded due to the continuous increase in the pressure of the first volume VL1 and the second volume VL2 in the flow rate control apparatus 100 while quickly achieving the differential pressure necessary to realize the set flow rate.

Figure 5:
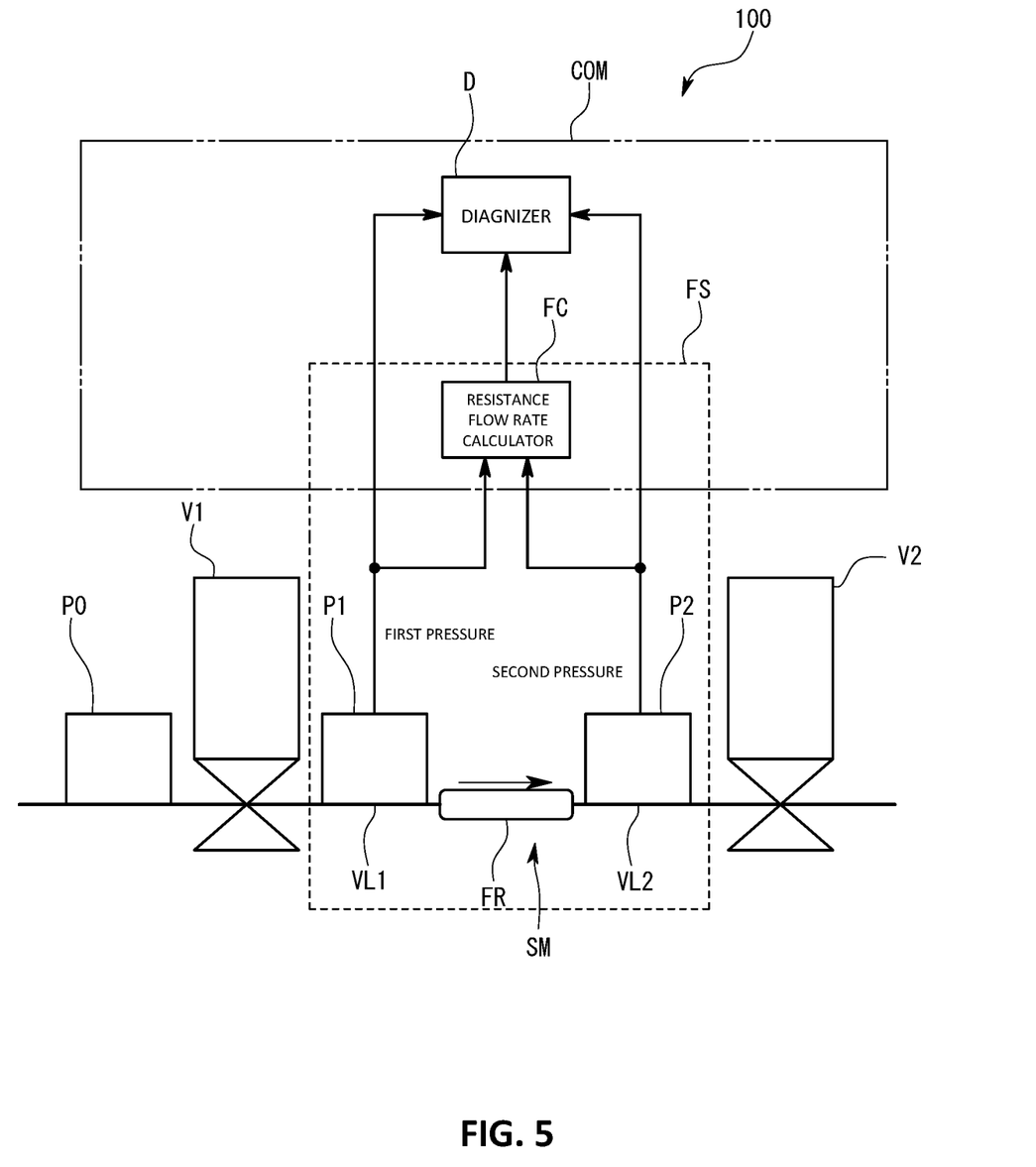
FIG. 5 is a schematic diagram showing a configuration of the flow rate control apparatus in a second embodiment of the present claimed invention.

Next, the flow rate control apparatus 100 according to a second embodiment of the present claimed invention will be described with reference to FIG. 5.

The flow rate control apparatus 100 of the second embodiment further comprises a diagnizer (D) that self-diagnoses and calibrates the volumes of the first volume VL1 and the second volume VL2 in addition to the configuration for flow rate control explained in the first embodiment. More concretely, the diagnizer (D) performs a predetermined valve operation during a process stop period when no gas is supplied to the chamber and identifies a size of the first volume VL1 and the second volume VL2 based on the pressure change in the first volume VL1 or the second volume VL2 caused by the valve operation. In addition, the diagnizer (D) also identifies the first volume VL1 or the second volume VL2 based on the change in the first pressure $p_1$ or the second pressure $p_2$ that occurs when the first valve V1 and the second valve V2 are fully closed to temporarily stop the gas supply during a process of supplying the gas to the chamber.

The diagnizer (D) identifies the size of the first volume VL1 and the second volume VL2 based on the output of the first pressure sensor P1, the second pressure sensor P2, the flow rate sensor (FS), and the temperature sensor, which is not shown in figures.

First, the identification of the second volume VL2 will be explained. After depressurizing the inside of the flow rate control apparatus 100 to a predetermined pressure, the diagnizer (D) fully opens the first valve V1 and fully closes the second valve V2 to fill the first volume VL1 and the second volume VL2 with gas. This filling of gas is continued until the pressure equilibrium point where the first pressure $p_1$ and the second pressure $p_2$ become almost the same pressure. The diagnizer (D) calculates the volume $V_{L2}$ of the second volume VL2 based on an integrated value of the resistance flow rate $Q_{FR}$ from a point when the pressure difference between the first pressure $p_1$ and the second pressure $p_2$ at or near the start of gas filling is the maximum to a point of reaching the pressure equilibrium point, $\Delta p_2$ which is the pressure difference of the second pressure $p_2$ between at the start and the end of the integrated value of the resistance flow rate $Q_{FR}$, and the gas state equation.

Next, the identification of the first volume VL1 will be explained. After increasing the pressure in the flow rate control apparatus 100 to a predetermined pressure, the diagnizer (D) fully closes the first valve V1 and fully opens the second valve V2 to discharge the gas in the first volume VL1 and the second volume VL2. This gas discharge is continued until the pressure equilibrium point where the first pressure $p_1$ and the second pressure $p_2$ are almost the same pressure. The diagnizer (D) calculates the volume $V_{L1}$ of the first volume VL1 based on an integrated value of the resistance flow rate $Q_{FR}$ from a point of the maximum pressure at or near the start of gas discharge to a point of reaching the pressure equilibrium point, $\Delta p_1$ which is the pressure difference of the first pressure $p_1$ between the start and the end of the integrated value of the resistance flow rate $Q_{FR}$, and the gas state equation.

The diagnizer (D) calibrates parameters used for conversion by replacing the identified volume $V_{L1}$ and the identified volume $V_{L2}$ with values used in the first valve flow rate converter 11 and the second valve flow rate converter 21.

In accordance with the second embodiment, it is possible to self-diagnose the size of the first volume VL1 and the second volume $V_{L2}$ based only on the outputs of the various sensors constituting the flow rate control apparatus 100 and to self-calibrate the values of each volume used in the first valve flow rate converter 11 and the second valve flow rate converter 21.

Therefore, even if the flow rate control apparatus 100 deviates from the designed value due to instrumental differences or even if the size that acts as the first volume VL1 and the second volume VL2 changes due to change over time, the deviated value can be calibrated to the correct values so that it is possible to keep the precision of each calculated valve flow rate and the accuracy. As a result of this, it is possible to keep the flow rate control accuracy high for a long period of time. In addition, this kind of diagnosis can be realized without any special operation in between processes.

Figure 6:
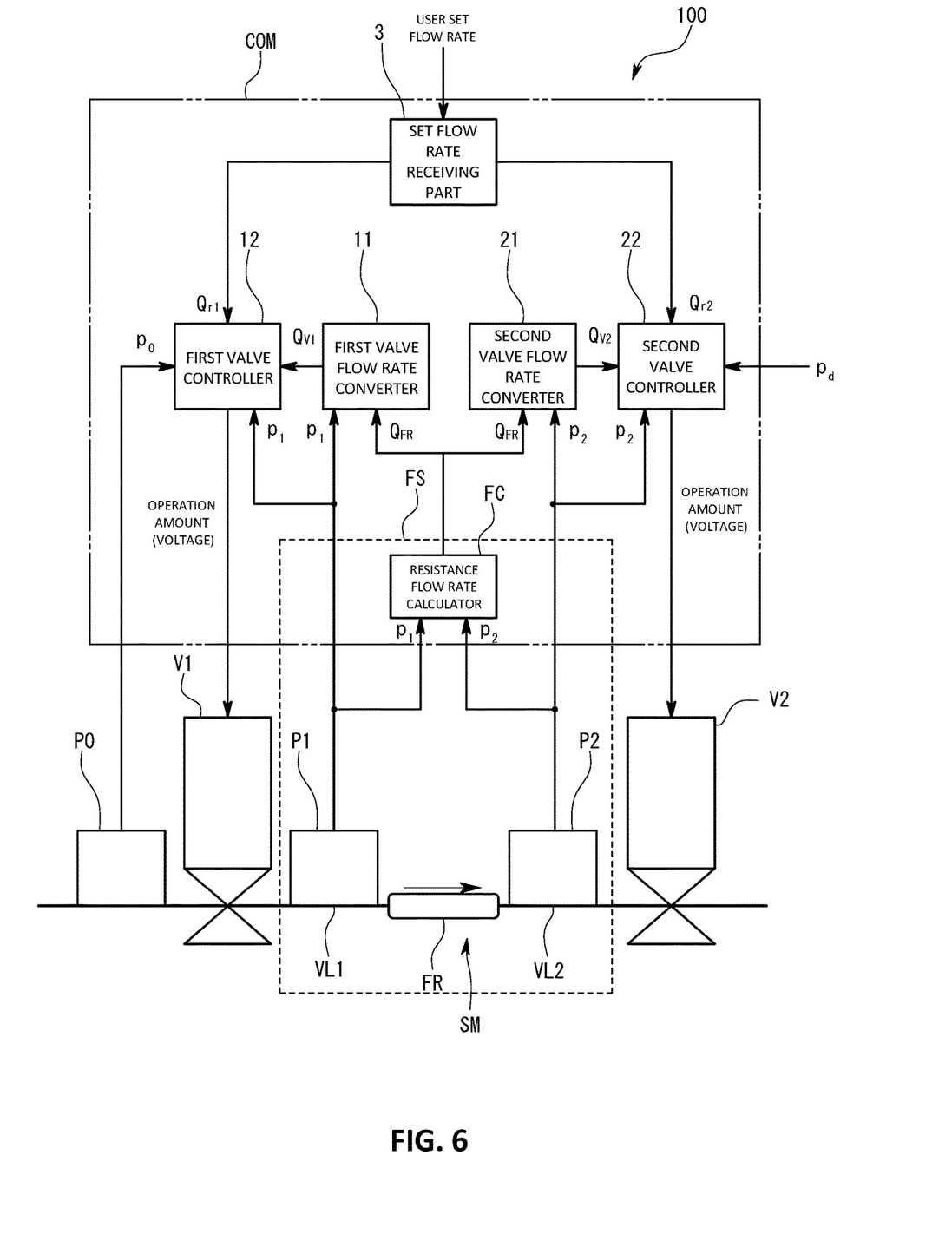
FIG. 6 is a schematic diagram showing a configuration of the flow rate control apparatus in a third embodiment of the present claimed invention.

Next, the flow rate control apparatus 100 in a third embodiment will be described with reference to FIG. 6 and FIGS. 7(a) and 7(b).

The flow rate control apparatus 100 in the third embodiment differs from the first embodiment in the configuration of the first valve controller 12 and the second valve controller 22. More concretely, the first valve controller 12 changes a control coefficient based on the set flow rate and a differential pressure between the supply pressure and the first pressure. The second valve controller 22 changes the control coefficient based on the set flow rate and the differential pressure between the second pressure and a downstream side pressure. For this purpose, the first valve controller 12 is configured to obtain the supply pressure $p_0$ from the supply pressure sensor PO and to obtain the first pressure $p_1$ from the first pressure sensor P1. Similarly, the second valve controller 22 is configured to obtain the second pressure $p_2$ from the second pressure sensor P2 and to obtain the downstream side pressure $p_d$, which is the pressure in the downstream side of the second valve V2, from, for example, a vacuum gauge arranged in a chamber.

Figure 7A:
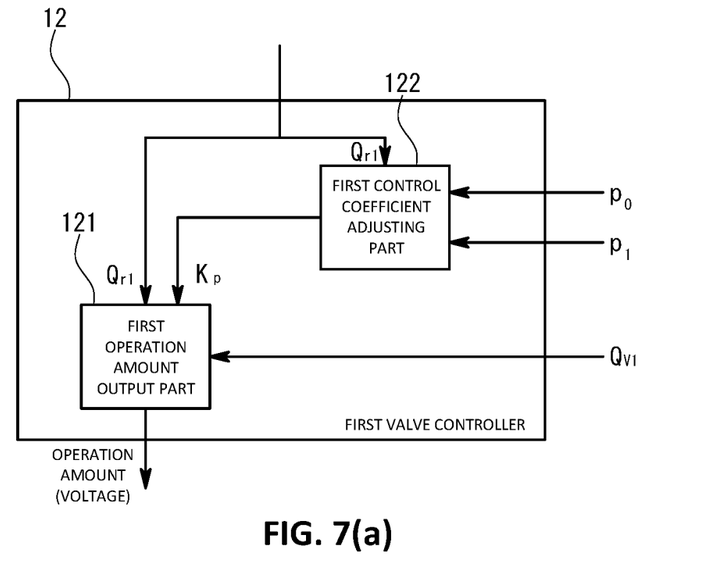
FIGS. 7(a) and 7(b) are schematic diagrams showing a detail of a first valve controller and a second valve controller in a third embodiment.

As shown in FIG. 7(a), the first valve controller 12 comprises a first operation amount output part 121 that performs a PID calculation on the deviation between the first set flow rate $Q_{r1}$ and the first valve flow rate $Q_{V1}$ output from the first valve flow rate converter 11 and that outputs a voltage according to the result of the PID calculation to the first valve V1 as an operation amount and a first control coefficient adjustment part 122 that adjusts the PID coefficient, which is a control coefficient used in the PID calculation of the first operation amount output part 121, according to the first set flow rate $Q_{r1}$ and $\Delta_{p1}$, which is the differential pressure between the supply pressure $p_0$ and the first pressure $p_1$.

The first operation amount output part 121 performs the PID control on the flow rate of the gas passing through the first valve V1 based on the PID coefficient set for each control cycle and the deviation of the calculated flow rate.

The first control coefficient adjustment part 122 adjusts at least the proportional gain (Kp) among the PID coefficients of the first operation amount output part 121 in accordance with the obtained first set flow rate $Q_{r1}$ and the differential pressure $\Delta p_1$. The first control coefficient adjustment part 122 increases a value of the proportional gain (Kp) as the value of the target flow rate of the first set flow rate $Q_{r1}$ increases. In addition, the first control coefficient adjustment part 122 increases the value of the proportional gain (Kp) as the differential pressure $\Delta p_1$ becomes larger. More concretely, in case that $B_1$ is a positive number and C1 is a positive number greater than 0 and less than 1, the first control coefficient adjustment part 122 adjusts the value of the proportional gain (Kp) based on the function $B_1 * (\Delta p_1)^{C1}$ of the differential pressure $\Delta p_1$. In this embodiment, C1 is set to ½.

Figure 7B:
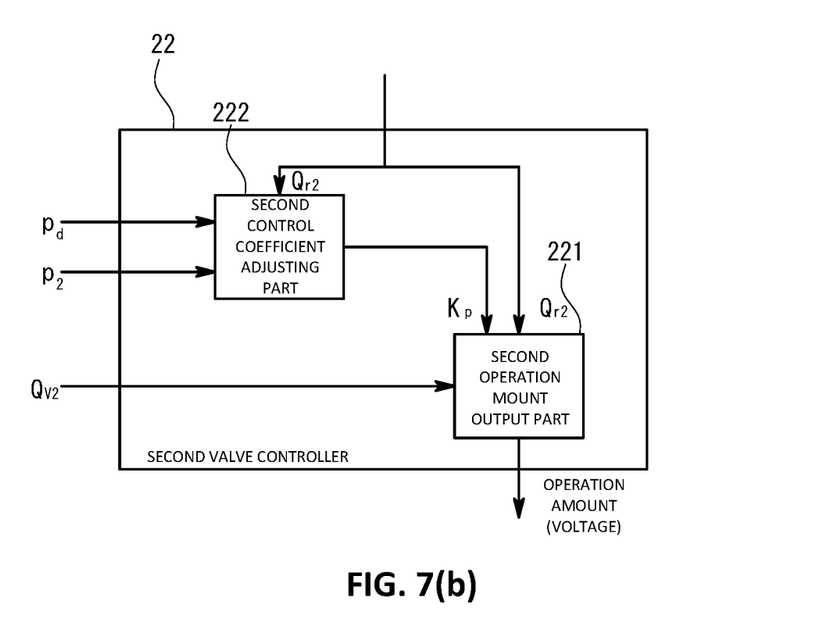

As shown in FIG. 7(b), the second valve controller 22 comprises a second operation amount output part 221 that performs the PID calculation on the deviation between the second set flow rate $Q_{r2}$ and the second valve flow rate $Q_{V2}$ output from the second valve flow rate converter 21 and that outputs a voltage according to the result of the PID calculation to the second valve V2 as the operation amount and a second control coefficient adjustment part 222 that adjusts the PID coefficient, which is a control coefficient used in the PID calculation of the second operation amount output part 221, according to the second set flow rate $Q_{r2}$ and $\Delta p2$, which is the differential pressure between the second pressure $p_2$ And the pressure $P_d$ in the downstream side.

The second operation amount output part 221 performs the PID control on the flow rate of the gas passing through the second valve V2 based on the PID coefficient set for each control cycle and the deviation of the calculated flow rate.

The second control coefficient adjustment part 222 adjusts at least the proportional gain (Kp) among the PID coefficients of the second operation amount output part 221 in accordance with the obtained second set flow rate $Q_{r2}$ and the differential pressure $\Delta p_2$. The second control coefficient adjustment part 222 increases the value of the proportional gain (Kp) as the value of the target flow rate of the second set flow rate $Q_{r2}$ increases. In addition, the second control coefficient adjustment part 222 increases the value of the proportional gain (Kp) as the differential pressure $\Delta p_2$ becomes larger. More concretely, in case that $B_2$ is a positive number and C2 is a positive number greater than 0 and less than 1, the second control coefficient adjustment part 222 adjusts the value of the proportional gain (Kp) based on the function $B_2*(\Delta p_2)^{C2}$ of the differential pressure $\Delta p_2$. In this embodiment, C2 is set to ½.

In accordance with the flow rate control apparatus 100 of the third embodiment having the above-mentioned arrangement, it is possible to set the proportional gain (Kp) according to the value of the target flow rate of the set flow rate at each time point and the differential pressure before and after the first valve V1 or the second valve V2. As a result of this, it is possible to continue maintaining the state in which flow rate control can be realized at the highest speed as the flow rate control apparatus 100. In addition, since the value of the proportional gain (Kp) is changed in proportion to the one-half power of the differential pressure, the controllability can be particularly improved in case that the flow rate increases in proportion to the square of the differential pressure by an orifice formed in the first valve V1 and the second valve V2.

In addition, since the proportional gain (Kp) can be changed successively as described above, tracking performance of the actual flow rate to changes in the set flow rate can be greatly improved compared with a conventional method, and the high-speed flow rate control required in, for example, semiconductor manufacturing processes can be realized.

Other embodiments will be explained.

The first valve flow rate converter or the second valve flow rate converter calculates the first valve flow rate or the second valve flow rate based on the resistance flow rate and the time differential value of the first pressure or the time differential value of the second pressure, but is not limited thereto. More specifically, the first valve flow rate converter may be used to calculate the first valve flow rate based on the resistance flow rate and the first pressure, and the second valve flow rate converter may be used to calculate the second valve flow rate based on the resistance flow rate and the second pressure. More concretely, instead of using the time differential value of the first pressure or the time differential value of the second pressure, the difference of the first pressure or the difference of the second pressure between a minute time change may be used. In addition, a time change amount of the first pressure or the time change amount of the second pressure may be used, and these values may be multiplied by a correction coefficient or the like as appropriate.

The first valve flow rate converter and the second valve flow rate converter may have different coefficients to match the flow rate characteristics or may be corrected as appropriate, even if the same flow rate conversion equation is used for each.

The first valve controller is to switch between the flow feedback control and the pressure feedback control in the control state, however, it may also implement other controls. For example, in a state wherein the second valve controller controls the second valve so that the deviation between the set flow rate and the second valve flow rate becomes small, the first valve controller may be configured to control the first valve so that the deviation between the voltage applied to the second valve and the target voltage becomes small.

The second valve controller may also be configured to switch to, for example, the pressure feedback control other than the flow feedback control according to the flow rate control state.

In the third embodiment, the control coefficients in both the first valve controller and the second valve controller are changed according to the set flow rate and the differential pressure before and after each valve, but only either one of the first valve and the second valve controllers may be configured so that the control coefficient is changed successively. In addition, the configuration of the first valve controller or the second valve controller may be applied to a flow rate control apparatus comprising only one valve. The first control coefficient adjustment part or the control coefficient to be adjusted by the first control coefficient adjustment part is not limited to proportional gain but may also be used to adjust the integral gain or the differential gain of the PID coefficient. Furthermore, in case that the flow rate control is performed by a control law other than the PID control in the first operation amount output part or the second operation amount output part, the control coefficient used in that control law may be adjusted by the first control coefficient adjustment part or the second control coefficient adjustment part.

In addition, the embodiments may be modified variously or a part of each embodiment may be combined each other without departing from a spirit of the present claimed invention.

100 . . . flow rate control apparatus
V1 . . . first valve
V2 . . . second valve
FS . . . flow rate sensor
SM . . . sensing mechanism
FC . . . resistance flow rate calculator
P1 . . . first pressure sensor
P2 . . . second pressure sensor
11 . . . first valve flow rate converter
12 . . . first valve controller
121 . . . first operation amount output part
122 . . . first control coefficient adjustment part
21 . . . second valve flow rate converter
22 . . . second valve controller
221 . . . second operation amount output part
222 . . . second control coefficient adjustment part
3 . . . set flow rate receiving part
D . . . diagnizer

The invention claimed is:

1. A flow rate control apparatus comprising
a first valve arranged in a flow channel,
a second valve arranged in a downstream side of the first valve in the flow channel,
a fluid resistor arranged between the first valve and the second valve in the flow channel,
a first pressure sensor that measures a pressure in a first volume between the first valve and the fluid resistor,
a second pressure sensor that measures a pressure in a second volume between the fluid resistor and the second valve, a resistance flow rate calculator that calculates a resistance flow rate, which is a flow rate of a fluid flowing through the fluid resistor, based on a first pressure measured by the first pressure sensor and a second pressure measured by the second pressure sensor,
a first valve flow rate converter that converts the resistance flow rate to a first valve flow rate, which is the flow rate of the fluid passing through the first valve, based on a first pressure,
a second valve flow rate converter that converts the resistance flow rate to a second valve flow rate, which is the flow rate of the fluid passing through the second valve, based on a second pressure,
a first valve controller that controls the first valve to control a deviation between a first set flow rate and the first valve flow rate, and
a second valve controller that controls the second valve to control a deviation between a second set flow rate and the second valve flow rate.

2. The flow rate control apparatus described in claim 1, wherein the first valve flow rate converter calculates the first valve flow rate based on the resistance flow rate and a time differential value of the first pressure.

3. The flow rate control apparatus described in claim 1, wherein the second valve flow rate converter calculates the second valve flow rate based on the resistance flow rate and a time differential value of the second pressure.

4. The flow rate control apparatus described in claim 3, wherein
in case that the resistance flow rate is $Q_{FR}$, the first valve flow rate is $Q_{V1}$, the second valve flow rate is $Q_{V2}$, the first pressure is $p_1$, the second pressure is $p_2$, the first conversion coefficient is $A_1$, and the second conversion coefficient is $A_2$,
the first valve flow rate converter calculates the first valve flow rate by $Q_{V1}=Q_{FR}+A_1 * d(p_1)/dt$, and
the second valve flow rate converter calculates the second valve flow rate by $Q_{V2}=Q_{FR}-A_2 * d(p_2)/dt$.

5. The flow rate control apparatus described in claim 4, wherein
in case that a size of the first volume is $VL_1$, a size of the second volume is $VL_2$, a gas constant is R, temperature is T, and a compressibility factor is Z,
$A_1=Z*VL_1/RT$, and $A_2=Z* V_{L2}/RT$.

6. The flow rate control apparatus described in claim 1, wherein
the first set flow rate and the second set flow rate are set as the same time function.

7. The flow rate control apparatus described in claim 6, wherein
in a state wherein the second valve is fully closed by the second valve controller,
the first valve controller controls an opening degree of the first valve to control the deviation between the first pressure and the set pressure.

8. The flow rate control apparatus described in claim 7, wherein
during a predetermined period after the time when the second set flow rate reaches a value other than zero in a state wherein the second valve is fully closed,
the first valve controller controls the opening degree of the first valve to control the deviation between the first set flow rate and the first valve flow rate, and
the second valve controller controls the opening degree of the second valve to control the deviation between the second set flow rate and the second valve flow rate.

9. The flow rate control apparatus described in claim 8, wherein
in a state wherein an absolute value of the deviation in the first valve controller or the second valve controller becomes less than or equal to a predetermined value,
in case that the first set flow rate is $Q_1$ and the correction value is x,
the first valve controller controls the opening degree of the first valve to control the deviation between the first set flow rate $Q_{r1}$-x after correction and the first valve flow rate $Q_{V1}$.

10. The flow rate control apparatus described in claim 9, wherein
after the second valve flow rate flowing out from the second valve is stabilized at the set flow rate,
the second valve controller controls the opening degree of the second valve to a fully open state, and
the first valve controller controls the opening degree of the first valve to control the deviation between the first set flow rate and $Q_{FR} \pm A_1 * d(p_1)/dt$, which is the first valve flow rate.

11. The flow rate control apparatus described in claim 1, further comprising
the first volume, which is a space formed between the first valve and the fluid resistor and wherein the first pressure is measured by the first pressure sensor,
the second volume, which is a space formed between the fluid resistor and the second valve and wherein the second pressure is measured by the second pressure sensor, and
a diagnizer that identifies a size of the first volume or the second volume based on the resistance flow rate, the first pressure, or the second pressure, wherein
the diagnizer corrects a parameter used for flow rate conversion in the first valve flow rate converter or the second valve flow rate converter based on the size of the first volume or the second volume.

12. The flow rate control apparatus described in claim 1, further comprising
a supply pressure sensor arranged in an upstream side of the first valve, wherein
the first valve controller comprises
a first operation amount output part that outputs to the first valve an operation amount calculated based on a deviation between the first set flow rate and the first valve flow rate and a control coefficient that has been previously set, and
the first control coefficient adjustment part that adjusts the control coefficient set in the first operation amount output part based on a differential pressure $\Delta p_1$ between the supply pressure $p_0$ measured by the supply pressure sensor and the first pressure $p_1$ measured by the first pressure sensor, and the first set flow rate $Q_{v1}$.

13. The flow rate control apparatus described in claim 12, wherein
the second valve controller comprises
a second operation amount output part that outputs an operation amount calculated based on a deviation between the second set flow rate and the second valve flow rate and the control coefficient that has been previously set to the second valve, and
the second control coefficient adjustment part that adjusts the control coefficient set in the second operation amount output part based on the differential pressure $\Delta p_2$ between the second pressure $p_2$ measured by the second pressure sensor and a downstream side pressure $p_d$ which is a pressure in a downstream side of the second valve, and the second set flow rate $Q_{V2}$.

14. The flow rate control apparatus described in claim 13, wherein in case that $B_1$ is a positive number and C1 is a positive number greater than 0 and less than 1,
the first control coefficient adjustment part adjusts the control coefficient based on a function $B_1*(\Delta p_1)^{C1}$ of the differential pressure $\Delta p_1$.

15. The flow rate control apparatus described in claim 14, wherein
in case that $B_2$ is a positive number and C2 is a positive number greater than 0 and less than 1,
the second control coefficient adjustment part adjusts the control coefficient based on a function $B_2*(\Delta p_2)^{C2}$ of the differential pressure $\Delta p_2$.

16. The flow rate control apparatus as claimed in claim 14, wherein
C1 or C2 is ½.

17. The flow rate control apparatus described in claim 14, wherein
the bigger the value of the first set flow rate or the second set flow rate, the bigger the value of the control coefficient is set.

18. The flow rate control apparatus described in claim 12, wherein
the control coefficient is a PID coefficient, and
the first control coefficient adjustment part and the second control coefficient adjustment part adjust at least a proportional gain.

19. A flow rate control method using a flow rate control apparatus comprising a first valve arranged in a flow channel, a second valve arranged in a downstream side of the first valve in the flow channel, a fluid resistor arranged between the first valve and the second valve in the flow channel, a first pressure sensor that measures a pressure in a first volume between the first valve and the fluid resistor, and a second pressure sensor that measures a pressure in a second volume between the fluid resistor and the second valve, wherein the flow rate control method comprises
calculating a resistance flow rate, which is a flow rate of a fluid flowing through the fluid resistor, based on a first pressure measured by the first pressure sensor and a second pressure measured by the second pressure sensor;
converting the resistance flow rate to a first valve flow rate, which is the flow rate of the fluid passing through the first valve, based on the first pressure;
converting the resistance flow rate to a second valve flow rate, which is the flow rate of the fluid passing through the second valve, based on the second pressure;
controlling the first valve to control the deviation between a first set flow rate and the first valve flow rate; and
controlling the second valve to control the deviation between a second set flow rate and the second valve flow rate.

20. A program recording medium recording a flow rate control program used for a flow rate control apparatus comprising a first valve arranged in a flow channel, a second valve arranged in a downstream side of the first valve in the flow channel, a fluid resistor arranged between the first valve and the second valve in the flow channel, a first pressure sensor that measures a pressure in a first volume between the first valve and the fluid resistor, and a second pressure sensor that measures a pressure in a second volume between the fluid resistor and the second valve, wherein making a computer exhibit functions as
a resistance flow rate calculator that calculates a resistance flow rate, which is a flow rate of a fluid flowing through the fluid resistor, based on a first pressure measured by the first pressure sensor and a second pressure measured by the second pressure sensor,
a first valve flow rate converter that converts the resistance flow rate to a first valve flow rate, which is the flow rate of the fluid passing through the first valve, based on the first pressure,
a second valve flow rate converter that converts the resistance flow rate to a second valve flow rate, which is the flow rate of the fluid passing through the second valve, based on the second pressure,
a first valve controller that controls the first valve to control the deviation between a first set flow rate and the first valve flow rate, and
a second valve controller that controls the second valve to control the deviation between a second set flow rate and the second valve flow rate.

* * * * *

UNITED STATES PATENT AND TRADEMARK OFFICE
CERTIFICATE OF CORRECTION

PATENT NO. : 11,454,993 B2
APPLICATION NO. : 17/444316
DATED : September 27, 2022
INVENTOR(S) : Kazuya Tokunaga It is certified that error appears in the above-identified patent and that said Letters Patent is hereby corrected as shown below:

In the Claims

Claim 5, Line 44, delete "$V_{L2}$" and replace with --$VL_2$--

Claim 9, Line 6, delete "$Q_1$" and replace with --$Q_{r1}$--

Claim 10, Line 20, delete "±" and replace with --+--

Claim 13, Line 2, delete "$Q_{V2}$" and replace with --$Q_{v2}$--

Signed and Sealed this
Twenty-eighth Day of February, 2023

Katherine Kelly Vidal
*Director of the United States Patent and Trademark Office*